(12) United States Patent
Davis et al.

(10) Patent No.: US 8,628,206 B1
(45) Date of Patent: Jan. 14, 2014

(54) LOW COST BACKLIGHT FOR NVIS COMPATIBLE OPERATION

(75) Inventors: Joshua V. Davis, Marion, IA (US); Steven W. Kramer, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 300 days.

(21) Appl. No.: 13/234,559

(22) Filed: Sep. 16, 2011

(51) Int. Cl.
*G09F 13/08* (2006.01)
*F21V 9/04* (2006.01)
*F21V 13/08* (2006.01)

(52) U.S. Cl.
USPC ........... 362/97.3; 362/231; 362/242; 362/293

(58) Field of Classification Search
USPC ................ 362/97.3, 230, 231, 242, 243, 293
See application file for complete search history.

(56) References Cited

U.S. PATENT DOCUMENTS

| | | | |
|---|---|---|---|
| 6,419,372 B1 * | 7/2002 | Shaw et al. | 362/231 |
| 6,789,921 B1 * | 9/2004 | Deloy et al. | 362/97.3 |
| 7,025,474 B2 * | 4/2006 | Campbell et al. | 362/231 |
| 7,525,611 B2 * | 4/2009 | Zagar et al. | 349/68 |
| 7,674,000 B2 * | 3/2010 | Valerio et al. | 362/97.3 |
| 7,924,371 B1 * | 4/2011 | Davis | 349/68 |
| 8,235,541 B2 * | 8/2012 | Chen | 362/97.3 |

* cited by examiner

*Primary Examiner* — Alan Cariaso
(74) *Attorney, Agent, or Firm* — Donna P. Suchy; Daniel M. Barbieri

(57) ABSTRACT

A night vision compatible backlight is disclosed. The backlight may include a base layer and a spacer layer. The spacer layer defines a plurality of arrays of openings, each includes a first set of openings and a second set of openings alternately distributed along the array. The backlight also includes a first set of LED modules electronically connected to the base layer through the first set of openings and a second set of LED modules electronically connected to the base layer through the second set of openings. The backlight further includes a filtering layer for providing infrared filtering for the second set of LED modules. The first set of LED modules and the second set of LED modules may be selectively energized to provide: a first mode where the first set of LED modules are energized, and a second mode where only the second set of LED modules are energized.

19 Claims, 5 Drawing Sheets

LOW COST BACKLIGHT FOR NVIS COMPATIBLE OPERATION

TECHNICAL FIELD

The present disclosure relates generally to display systems and more particularly to a backlight for night vision compatible operations.

BACKGROUND

Certain flat panel displays such as liquid crystal displays and the like do not produce light themselves. Illumination (ambient light or a special light source) is therefore needed in order to produce visible images for such a display. A backlight is a form of illumination used in displays including liquid crystal displays (LCDs), active matrix liquid crystal displays (AMLCDs) or the like. Light source for a backlight may include white or colored light-emitting diodes (LEDs).

Displays used in some applications may be required to be compatible with night vision imaging systems (NVIS). For instance, certain avionics and/or ground vehicle displays not only need to be visible to unaided eyes, but also need to be compatible with night vision equipment (e.g., night vision goggles) without adversely affecting the operation of the night vision equipment. Traditional NVIS compatible LED backlights are typically single mode in operation with all of the LEDs being filtered by complex and expensive thin film filters. These single mode backlights are limited by luminance loss in day time operation as well as backlight dimming stability at the low end of the luminance range.

NVIS compatible dual mode backlights brought improvements addressing these specific issues, but most of these early dual mode backlights were encumbered with their own shortcomings. Many were difficult to build and produce or equally expensive relative to their single mode counterparts. Later dual mode variants improved upon cost, complexity, and producibility, but still encountered limitations, such as reliance upon specialized LED packaging styles such as reverse-mount emitter types which were limited in supplier base and lacking sufficiently tight specification control for color and luminance binning. Therein lies a need for a night vision compatible LED backlight that overcomes these shortcomings.

SUMMARY

The present disclosure is directed to a night vision compatible backlight. The backlight may include a base layer and a spacer layer positioned on a surface of the base layer. The spacer layer defines a plurality of arrays of openings. Each array of openings includes a first set of openings and a second set of openings alternately distributed along the array. The backlight also includes a first set of light-emitting diode (LED) modules electronically connected to the base layer through the first set of openings of each array and a second set of LED modules electronically connected to the base layer through the second set of openings of each array. The backlight further includes a filtering layer positioned on a surface of the spacer layer for providing infrared filtering for the second set of LED modules. The filtering layer further defines apertures generally coincide with the first set of openings of each array. A diffusive reflector is positioned on a surface of the filtering layer. The diffusive reflector defines apertures generally coincide with the first set of openings and the second set of openings of each array. In this manner, the first set of LED modules and the second set of LED modules may be selectively energized to provide: a first mode where the first set of LED modules are energized, and a second mode where only the second set of LED modules are energized.

A further embodiment of the present disclosure is directed to a night vision compatible backlight. The backlight may include a base layer and a spacer layer positioned on a surface of the base layer. The spacer layer defines a plurality of arrays of openings. Each array of openings includes a first set of openings and a second set of openings alternately distributed along the array. The backlight also includes a first set of light-emitting diode (LED) modules electronically connected to the base layer through the first set of openings of each array and a second set of LED modules electronically connected to the base layer through the second set of openings of each array. The backlight further includes a plurality of filtering elements positioned on a surface of the spacer layer for providing infrared filtering for the second set of LED modules. A diffusive reflector is positioned on the plurality of filtering elements. The diffusive reflector defines apertures generally coincide with the first set of openings and the second set of openings of each array. In this manner, the first set of LED modules and the second set of LED modules may be selectively energized to provide: a first mode where the first set of LED modules are energized, and a second mode where only the second set of LED modules are energized.

An additional embodiment of the present disclosure is directed to a method for providing backlighting. The method may include providing a plurality of arrays of light-emitting diode (LED) modules, each array of LED modules including a first set of LED modules and a second set of LED modules, the first set of LED modules and the second set of LED modules being alternately distributed along said array; providing infrared filtering for the second set of LED modules of each of the plurality of arrays; and selectively energized at least one of: the first set of LED modules of each of the plurality of arrays and the second set of LED modules of each of the plurality of arrays, for providing: a first mode where the first set of LED modules of each of the plurality of arrays are energized, and a second mode where only the second set of LED modules of each of the plurality of arrays are energized.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a backlight capable of providing night vision compatible operation. The backlight may include a single sided LED board having multiple arrays of top mount style LEDs. A film layer may be utilized to provide NVIS compatible filtering for one set of LEDs, and leave another set of LEDs unfiltered. The backlight may therefore selectively energize the unfiltered LEDs and/or the filtered LEDs to provide different modes of operation. Additional substrates/layers may also be utilized to manage potential light leaks. Using different arrays of top mount style LEDs, the backlight in accordance with the present disclosure may address binning and package style limitations associated with other backlights that are at least partially reliant upon reverse mount LEDs.

Figure 1:
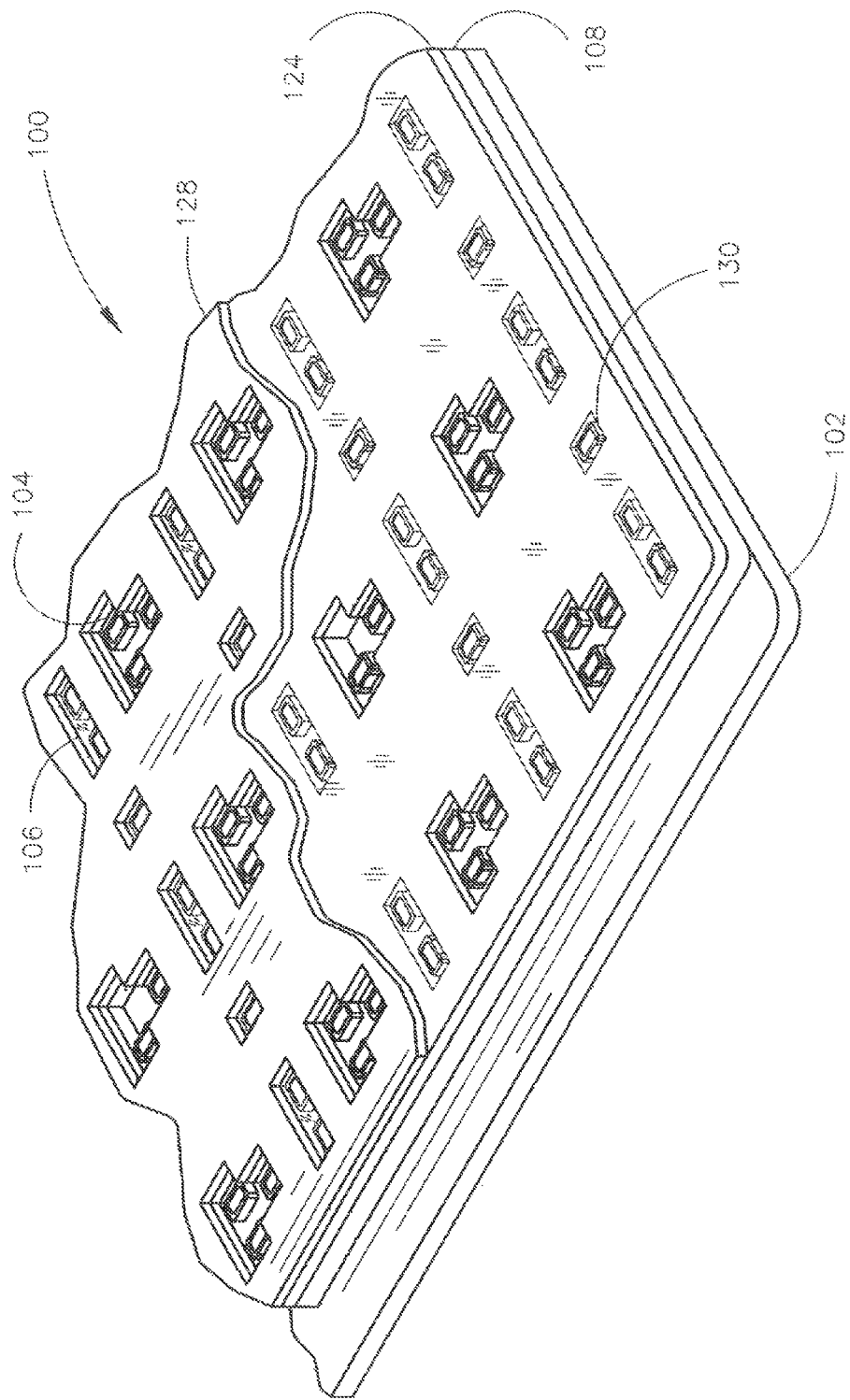
FIG. 1 is a partial isometric view illustrating a backlight in accordance with the present disclosure.
Figure 2:
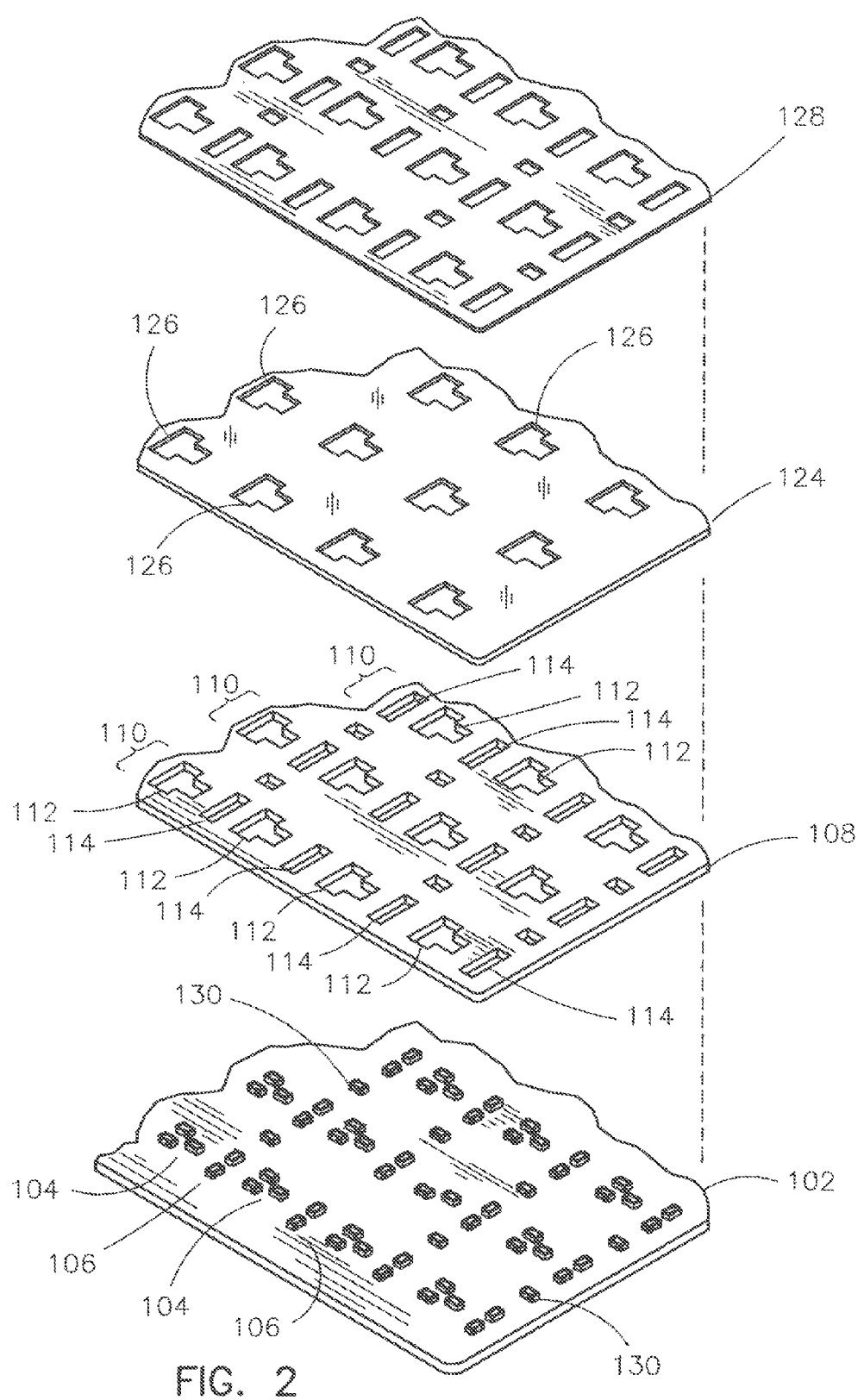
FIG. 2 is an exploded view of the backlight shown in FIG. 1.

Referring generally to FIGS. 1 through 4. FIG. 1 is a partial isometric view depicting a night vision compatible backlight 100 in accordance with the present disclosure and FIG. 2 is an exploded view of the backlight 100 as shown in FIG. 1. The backlight 100 may include a base layer 102 for supporting and providing electrical connections for various LED modules 104 and 106 installed thereof. For instance, the support base 102 may include a metal core circuit board, a printed circuit board (rigid or flexible) or the like for providing electrical power as well as control information to the LED modules.

The backlight 100 may also include a spacer layer 108 positioned on a surface of the base layer 102. The spacer layer 108 may define a plurality of arrays of openings 110. In one embodiment, each array 110 includes a first set of openings 112 and a second set of openings 114 alternately distributed along the corresponding array 110 as shown in FIG. 2. In this manner, a first set of LED modules 104 may be mounted to the base layer 102 through the first set of openings 112 and a second set of LED modules 106 may be mounted to the base layer 102 through the second set of openings 114.

The height of the spacer layer 108 may be equal to or greater than the height of the LED modules 104 and 106, therefore providing an elevated and generally uniform surface for additional layers/substrates that may need to be placed on top (with respect to the orientation as illustrated in FIGS. 1 and 2) of the spacer layer 108. In addition, the spacer layer 108 may be opaque and may absorb and/or prevent light leaks from the LED modules contained within. Furthermore, it is contemplated that the size of the openings provided on the spacer layer 108 may be determined based on the physical size of the LED modules. For instance, if the physical size of the LED module 104 is different from the physical size of the LED module 106, then their corresponding openings, 112 and 114 respectively, may differ in sizes. On the other hand, if the LED module 104 and the LED module 106 have the same physical size, then their corresponding openings may also be the same.

The purpose of utilizing two sets of LED modules is to provide at least two modes of operation. For instance, only the second set of LED modules 106 may need to be filtered (utilizing a filtering layer as explained below) in order to provide a night vision compatible mode of operation while the first set of LED modules 104 may remain unfiltered. In this manner, selectively energizing only the second set of LED modules 106 may provide a night vision compatible mode of operation. That is, the filtered LED modules 106 may provide illumination so that the display is not only visible to unaided eyes, but also compatible with night vision equipment (e.g., night vision goggles) without adversely affecting the operation of the night vision equipment. On the other hand, selectively energizing the first set of LED modules 104 may provide illumination to the display that is suitable for relatively bright operation conditions (e.g., in daylight or when ambient lighting levels are sufficiently high). That is, the LED modules 104 may provide illumination so that the display has optimal daylight readability (this mode of operation may be referred to as the day mode). Furthermore, both the first set and the second set of LED modules 104 and 106 may be energized simultaneously to enhance the day mode performance if so desired.

Figure 3:
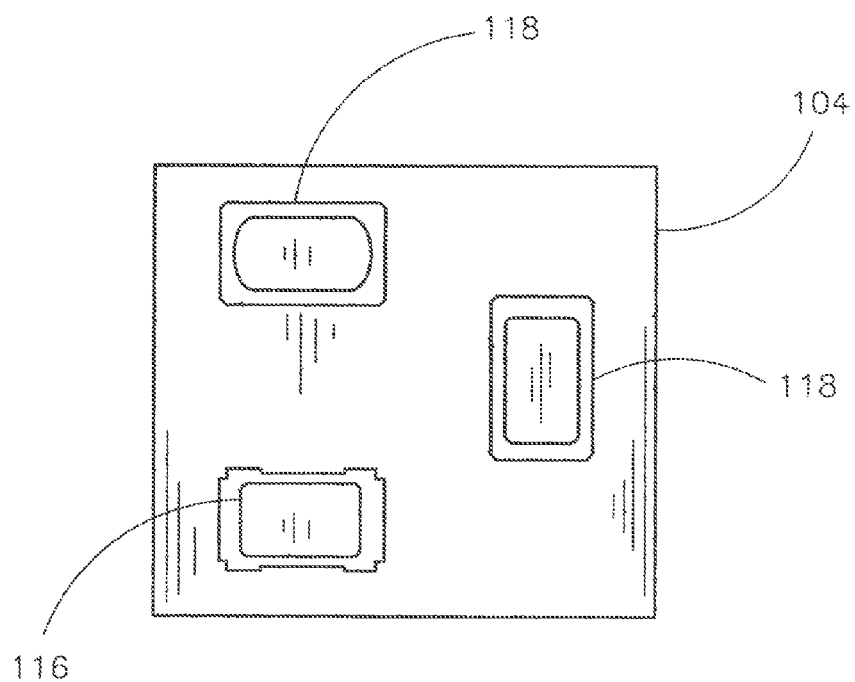
FIG. 3 is an illustration depicting an LED module in accordance with the present disclosure.
Figure 4:
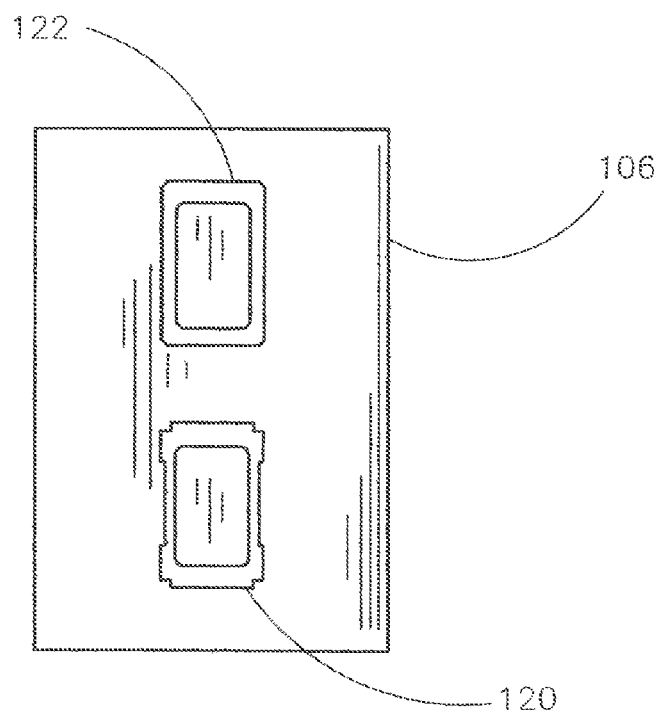
FIG. 4 is an illustration depicting another LED module in accordance with the present disclosure.

It is contemplated that each LED module may include one or more top mount type LEDs, as illustrated in FIGS. 3 and 4. For example, each LED module 104 may include at least one white LED 116 and optionally one or more colored (e.g., red, blue or the like) LEDs 118. Similarly, each LED module 106 may also include at least one white LED 120 and optionally one or more colored (e.g., red, blue or the like) LEDs 122. Alternatively, instead of utilizing white LEDs, each LED module 104 and 106 may include a multi-die RGB LED that includes at least one red LED, one green LED and one blue LED. It is also contemplated that each LED module may include various other types of LED components. For example, each white LED may include one high efficiency single die white LED, multiple autonomously packaged white light LEDs, or a singular white LED component with internal multi-die structure. In addition, each color LED may include multiple discrete emitters of varying color including, but not limited to, red, green, blue, yellow or white emitters. Each color LED may include either closely spaced discrete component groupings or they may be comprised of multiple discrete emitter die hosted within an integrated singular physical component package. Either variant of multi-color LED assembly would retain independent electrical drive capability for any of its individual color emitter die.

In a particular implementation, each LED module 104 includes a white LED, a red LED, and an optional blue LED; and each LED module 106 includes a white LED and a red LED. It is contemplated that not all LED modules 104 are required to be identical. For instance (as illustrated in FIG. 1), certain modules of the first set of LED modules 104 may include a white LED, a red LED and a blue LED while some other modules of the first set of LED modules 104 may include a white LED and a red LED. It is also contemplated that specific implementations may also vary from the examples described above without departing from the spirit and scope of the present disclosure.

The backlight 100 further includes a filtering layer 124 positioned on top of the spacer layer 108. The filtering layer 124 provides infrared filtering for the second set of LED modules 106 but does not filter the first set of LED modules 104. For instance, the filtering layer 124 may define apertures 126 that generally coincide with the locations of the first set of openings 112 of each array 110. In this manner, selectively activating/energizing the first set of LED modules 104 or the second set of LED modules 106 may provide different modes of operations. For example, the filtered LED modules 106 may be energized in order to provide a night vision compatible mode of operation. On the other hand, the unfiltered LED modules 104 may be energized to illuminate the display so that it is optimally visible in a daylight ambient environment.

Various absorptive filter materials may be utilized to form the filtering layer 124. For instance, absorptive filter materials such as polymeric or glass-based infrared filters may be utilized for filtering the LED modules 106. Alternatively, dichroic filters or thin film deposition techniques may also be utilized for filtering the LED modules 106. Furthermore, other infrared filter technologies may be utilized without departing from the spirit and scope of the present disclosure. For instance, the absorptive polymeric filters may provisionally have thin film surface treatments for enhanced performance. In another example, a hybrid absorptive/dichroic approach that adds infrared filter capability to a plain polymeric film or an already IR absorptive film may provide glass or polymer based filter materials suitable for forming the filtering layer 124.

The backlight 100 may further include a diffusive reflector 128 positioned on top of the filtering layer 124. The diffusive reflector 128 may define apertures that generally coincide with the both the first set of openings 112 and the second set of openings 114 of each array 110. In this manner, the diffusive reflector 128 may allow the light emitted by the LED modules to go through, and also provide diffuse reflection of recycled light in order to improve backlight uniformity and to produce a more even illumination (for a backlit display, for example).

It is contemplated that the arrangement of the set of LED modules 104 and the set of LED modules 106 (and the corresponding apertures and openings) depicted in the figures are exemplary. While the openings 112 and 114 are preferably alternately distributed within each array 110, such an arrangement is not required. Furthermore, while the plurality of arrays 110 may be evenly spaced and the openings 112 and 114 provided thereof may be distributed in substantially the same manner (amongst the various arrays 110), such arrangements may also vary without departing from the spirit and scope of the present disclosure.

It is also contemplated that additional single LED components 130 may be distributed at various positions on the backlight 100. In one embodiment, the single LED components 130 include white LEDs that are energized or de-energized together with the LED modules 106. Similar to the LED modules 106, illumination provided by the single LED components 130 may also be filtered by the filtering layer 124. Utilizing such single LED components 130 may help producing a more even illumination across the board. However, it is understood that such single LED components 130 are optional components; whether to include them in a particular backlight product and their specific positions may be determined based on various factors, such as costs, space availabilities, backlight cavity depth, uniformity requirements, or the like.

Figure 5:
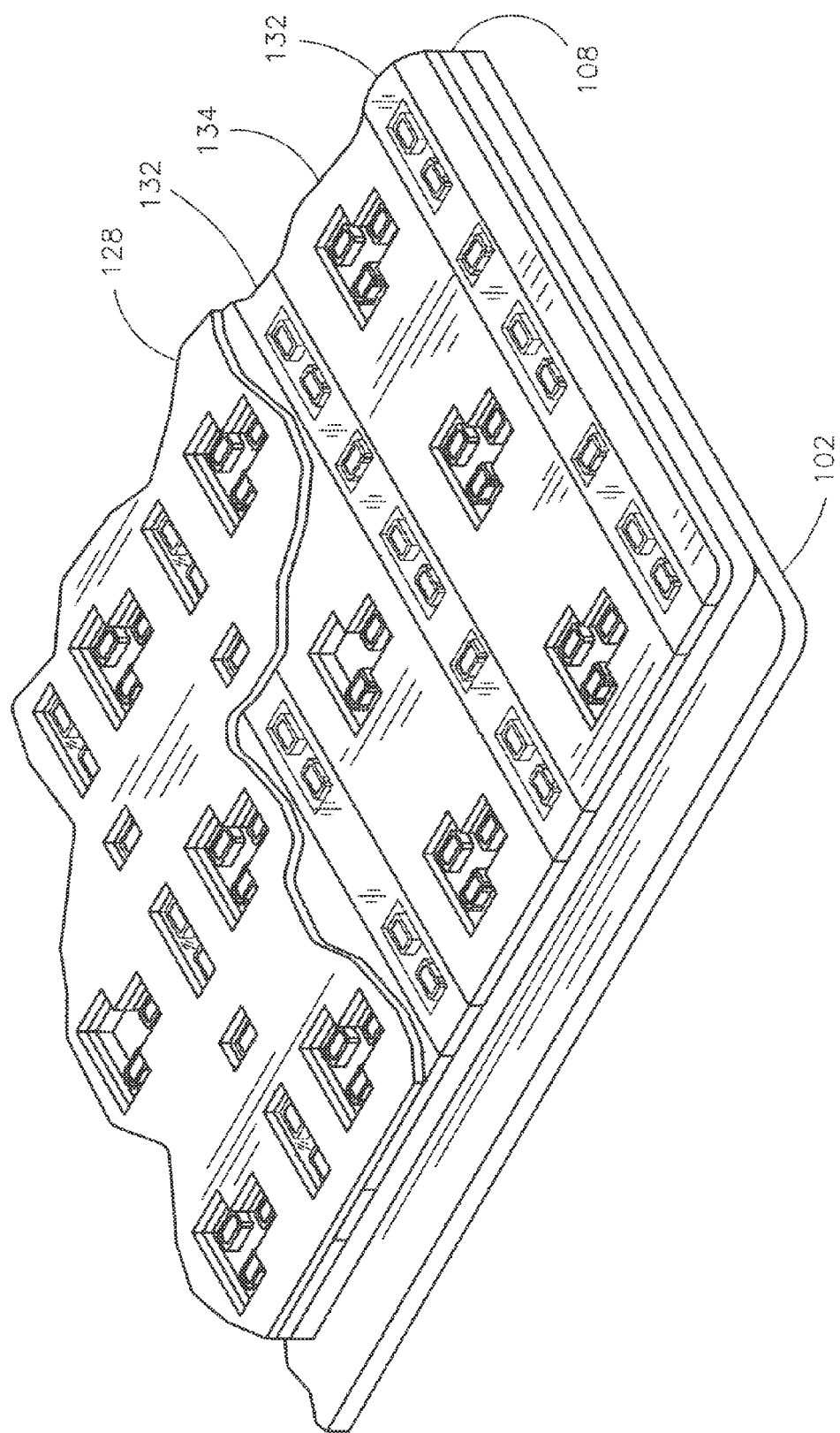
FIG. 5 is a partial isometric view illustrating another backlight in accordance with the present disclosure.

In an alternative embodiment as shown in FIG. 5, instead of utilizing a filtering layer 124 to cover the surface of the backlight, smaller infrared filtering elements may be utilized to cover the LED modules 106, therefore reducing the cost associated with the filtering materials. For instance, in the configuration illustrated in FIG. 5, a plurality of filtering strips 132 may be utilized to provide infrared filtering for the LED modules 106. A plurality of space fillers 134 may be utilized to fill the spaces in between the filtering strips 132. The spacer fillers 134 may define apertures that generally coincide with the locations of the openings for the LED modules 104. In this manner, the filtering strips 132 and the space fillers 134 may jointly form a layer that has substantially the same shape as the filtering layer 124 previously described. It is contemplated, however, that the filtering strips 132 and the space fillers 134 depicted in FIG. 5 are merely exemplary. Filtering elements and space filling elements may be in various shapes and forms as long as they allows the LED modules 104 to emit unfiltered light while providing infrared filtering for light emitted by the LED modules 106.

The night vision compatible backlight in accordance with the present disclosure may be utilized as a direct-view backlight for illuminating a display (e.g., a flat panel display). While the night vision compatible backlight is configured to be readily usable, it is contemplated that additional layers may be positioned between the backlight and the display to further enhance the performance. For instance, a hot mirror, a simplified thin film filter or the like may be positioned between the backlight and the display. Furthermore, such additional layers may be configured and/or packaged as an integrated part of the backlight without departing from the spirit and scope of the present disclosure.

Figure 6:
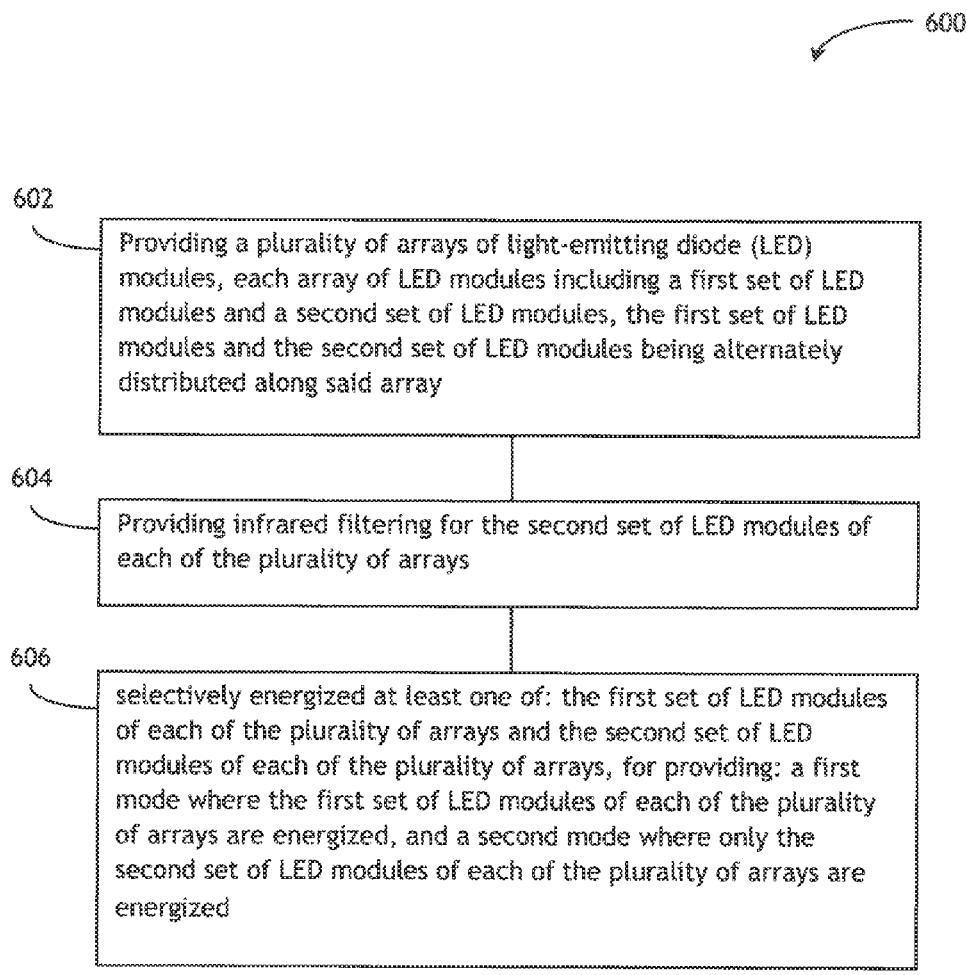
FIG. 6 is a flow chart illustrating a method for providing backlighting in accordance with the present disclosure.

Referring now to FIG. 6, a method 600 for providing night vision compatible backlighting is shown. Step 602 may provide a plurality of arrays of LED modules. Each array of LED modules may include a first set of LED modules and a second set of LED modules. In one embodiment, the first set of LED modules and the second set of LED modules are alternately distributed along said array as previously described. Step 604 may provide infrared filtering for the second set of LED modules of each of the plurality of arrays. Step 606 may selectively energize the first set of LED modules or the second set of LED modules on all of the arrays to provide the desired operation mode as described above. For instance, the first set of LED modules on all of the arrays may be energized to provide optimal illumination in a daylight ambient environment (i.e., a first mode, or a day mode). On the other hand, the second set of LED modules on all of the arrays may be energized in order to provide a night vision compatible mode of operation (i.e., a second mode, or a night mode). Furthermore, both sets of LED modules on all of the arrays may be energized simultaneously to enhance the performance of the day mode if so desired.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A night vision compatible backlight, comprising:
   a base layer;
   a spacer layer positioned on a surface of the base layer, the spacer layer defining a plurality of arrays of openings, each array of openings including a first set of openings and a second set of openings, the first set of openings and the second set of openings being alternately distributed along said array;

a first set of light-emitting diode (LED) modules electronically connected to the base layer through the first set of openings of each array;

a second set of LED modules electronically connected to the base layer through the second set of openings of each array;

a filtering layer positioned on a surface of the spacer layer for providing infrared filtering for the second set of LED modules, the filtering layer further defining apertures generally coincide with the first set of openings of each array; and a diffusive reflector positioned on a surface of the filtering layer, the diffusive reflector defining apertures generally coincide with the first set of openings and the second set of openings of each array, wherein the first set of LED modules and the second set of LED modules are selectively energized for providing: a first mode where the first set of LED modules are energized, and a second mode where only the second set of LED modules are energized.

2. The night vision compatible backlight of claim 1, wherein the first set of LED modules and the second set of LED modules are both energized in the first mode.

3. The night vision compatible backlight of claim 1, wherein each of the first set of LED modules comprises a top mount white LED.

4. The night vision compatible backlight of claim 3, wherein each of the first set of LED modules further comprises at least one of: a top mount red LED and a top mount blue LED.

5. The night vision compatible backlight of claim 1, wherein each of the first set of LED modules comprises a top mount red LED, a top mount green LED and a top mount blue LED.

6. The night vision compatible backlight of claim 1, wherein each of the second set of LED modules comprises a top mount white LED.

7. The night vision compatible backlight of claim 6, wherein each of the second set of LED modules further comprises a top mount red LED.

8. The night vision compatible backlight of claim 1, wherein each of the second set of LED modules comprises a top mount red LED, a top mount green LED and a top mount blue LED.

9. The night vision compatible backlight of claim 1, wherein the filtering layer comprises at least one of: a polymeric infrared filter or a dichroic filter.

10. A night vision compatible backlight, comprising:
a base layer;
a spacer layer positioned on a surface of the base layer, the spacer layer defining a plurality of arrays of openings, each array of openings including a first set of openings and a second set of openings, the first set of openings and the second set of openings being alternately distributed along said array;

a first set of light-emitting diode (LED) modules electronically connected to the base layer through the first set of openings of each array;

a second set of LED modules electronically connected to the base layer through the second set of openings of each array;

a plurality of filtering elements positioned on a surface of the spacer layer for providing infrared filtering for the second set of LED modules; and a diffusive reflector positioned on the plurality of filtering elements, the diffusive reflector defining apertures generally coincide with the first set of openings and the second set of openings of each array, wherein the first set of LED modules and the second set of LED modules are selectively energized for providing: a first mode where the first set of LED modules are energized, and a second mode where only the second set of LED modules are energized.

11. The night vision compatible backlight of claim 10, wherein the first set of LED modules and the second set of LED modules are both energized in the first mode.

12. The night vision compatible backlight of claim 10, wherein each of the first set of LED modules comprises a top mount white LED.

13. The night vision compatible backlight of claim 12, wherein each of the first set of LED modules further comprises at least one of: a top mount red LED and a top mount blue LED.

14. The night vision compatible backlight of claim 10, wherein each of the first set of LED modules comprises a top mount red LED, a top mount green LED and a top mount blue LED.

15. The night vision compatible backlight of claim 10, wherein each of the second set of LED modules comprises a top mount white LED.

16. The night vision compatible backlight of claim 15, wherein each of the second set of LED modules further comprises a top mount red LED.

17. The night vision compatible backlight of claim 10, wherein each of the second set of LED modules comprises a top mount red LED, a top mount green LED and a top mount blue LED.

18. The night vision compatible backlight of claim 10, wherein each of the plurality of filtering elements comprises at least one of: a polymeric infrared filter or a dichroic filter.

19. The night vision compatible backlight of claim 10, further comprising a plurality of space fillers, the plurality of space fillers and the plurality of filtering elements jointly providing a substantially even surface for the diffusive reflector.

* * * * *